United States Patent [19]

Huang

[11] Patent Number: 5,708,082

[45] Date of Patent: Jan. 13, 1998

[54] PROCESS FOR PREPARING A STYRENIC RESIN

[75] Inventor: Shao-Chiu Huang, Tainan City, Taiwan

[73] Assignee: Chi Mei Corporation, Tainan Hsien, Taiwan

[21] Appl. No.: 677,729

[22] Filed: Jul. 8, 1996

[51] Int. Cl.$^6$ .................................................. C08F 279/04

[52] U.S. Cl. ........................... 525/87; 525/71; 525/86; 525/281; 525/316

[58] Field of Search ........................... 525/316, 86, 87, 525/281, 71

[56] References Cited

U.S. PATENT DOCUMENTS

| | | | |
|---|---|---|---|
| 3,957,912 | 5/1976 | Cincera | 525/316 |
| 4,151,128 | 4/1979 | Ackerman et al. | 525/316 |
| 4,598,124 | 7/1986 | Aliberti et al. | 525/86 |
| 5,180,786 | 1/1993 | Era et al. | 525/281 |

FOREIGN PATENT DOCUMENTS

| | | |
|---|---|---|
| 43-7551 | 10/1964 | Japan . |
| 0086918 | 7/1981 | Japan . |
| 1058480 | 7/1967 | United Kingdom . |

Primary Examiner—Irina S. Zemel
Attorney, Agent, or Firm—Ladas & Parry

[57] ABSTRACT

In a process for preparing a styrenic resin, a rubber graft copolymer (A) having a weight average particle size of 0.05–0.8 μm by coagulation and drying of a rubber graft copolymer latex (a). The rubber graft copolymer latex (a) is made from graft polymerization of a vinyl aromatic monomer and a vinyl cyanide monomer in the presence of a butadienic rubber latex. The styrenic resin is then prepared by a continuous bulk or solution polymerization method. The method comprises continuously charging 80 to 45 parts by weight of a vinyl aromatic monomer, 15 to 50 parts by weight of a vinyl cyanide monomer, 0 to 40 parts by weight of a copolymerizable monomer (totally 100 parts by weight of monomers), 0.1 to 6 parts by weight of the rubber graft copolymer based on 100 parts by weight of monomers and 0.1 to 10 parts by weight of an acrylic-based copolymer (B) based on 100 parts by weight of monomers into a reactor; polymerizing them to a conversion of 40 to 90 wt %; and removing the unreacted monomers and volatile components from the polymerized mixture. The styrenic resin produced by the above process has suitable impact strength, good rigidity and hardness, and excellent appearance and semi-transparency.

10 Claims, No Drawings

PROCESS FOR PREPARING A STYRENIC RESIN

BACKGROUND OF THE INVENTION

1. Field of the Invention

The invention relates to a process for preparing a styrenic resin, more particularly to a process for preparing a styrenic resin which has suitable impact strength, good rigidity and hardness, and excellent appearance and semi-transparency.

2. Description of the Related Art

Conventionally, a styrene-acrylonitrile copolymer is prepared by suspension polymerization, emulsion polymerization, solution polymerization or bulk polymerization. From the view points of reducing the emulsifier, stabilizing the resin quality and environmental considerations, solution or bulk polymerization is commonly used in recent years. The styrene-acrylonitrile copolymer produced by solution or bulk polymerization is characterized by its cost efficiency, good transparency, high rigidity and moldability, and is widely used for gas lighter, housings of electrical appliances, partition boards in refrigerators and for various containers. The main disadvantage of the styrene-acrylonitrile copolymer is its poor impact strength. Sometimes, a slight impact will possibly result in cracks or breakages thereof. Moreover, there are needs for semi-transparent resins, for example, the storage battery housing for liquid electrolyte which liquid level can be visualized and the lampion cover with light scattering function.

Since the quality requirement has gradually become more stringent in the recent years, such high quality resins certainly have large market appeal. Therefore, it is desirable to provide a styrenic resin which has a suitable impact strength, good tensile strength and hardness, and semi-transparency.

SUMMARY OF THE INVENTION

The main object of this invention is to provide a process for preparing a styrenic resin which has good impact strength, good tensile strength and hardness, and excellent appearance and semi-transparency.

The process of the present invention for preparing a styrenic resin is characterized by two steps:

(1) preparing a rubber graft copolymer (A) having a weight average particle size of 0.05–0.8 μm by coagulating and drying of a rubber graft copolymer latex (a); wherein the rubber graft copolymer latex (a) is made from graft polymerization of the vinyl aromatic monomer and the vinyl cyanide monomer in the presence of the dienic rubber latex; and (2) preparing the styrenic resin by a continuous bulk or solution polymerization method; wherein the method comprises (i) continuously charging 80 to 45 parts by weight of the vinyl aromatic monomer, 15 to 50 parts by weight of the vinyl cyanide monomer, 0 to 40 parts by weight of the copolymerizable monomer (totally 100 parts by weight of monomers), 0.1 to 6 parts by weight of said rubber graft copolymer (A) based on 100 parts by weight of monomers and 0.1 to 10 parts by weight of the acrylic based copolymer (B) based on 100 parts by weight of monomers into a reactor, wherein, the acrylic-based copolymer (B) is prepared from 10 to 100 wt % of at least one monomer selected from (meth)acrylate monomer and acrylonitrile, 0 to 80 wt % of vinyl aromatic monomer and 0 to 30 wt % of copolymerizable monomer; and (ii) polymerizing them to a conversion of 40 to 90%; and (iii) removing the unreacted monomers and volatile components from the polymerized mixture.

Thereby, a styrenic resin with a rubber content of below 0.1 to 4.5 wt % and having suitable impact resistance, good tensile strength and hardness, excellent appearance and semi-transparency is prepared.

DETAILED DESCRIPTION OF THE PREFERRED EMBODIMENT

In step 1 of the process of the present invention, a rubber graft copolymer latex (a) is made from graft polymerization of the vinyl aromatic monomer and the vinyl cyanide monomer in the presence of the dienic rubber latex. Then, a powdery rubber graft copolymer (A) having an average particle size of 0.05–0.8 μm is prepared by coagulating and drying of the rubber graft copolymer latex (a). The dienic rubber latex is a homopolymer or copolymer which is prepared from 100 to 60 weight percent of conjugated diene monomers and 0 to 40 weight percent of unsaturated monomers. The conjugate diene is represented by the following formula:

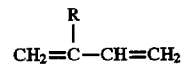

wherein, R is hydrogen, methyl group or chlorine. The unsaturated monomer for preparing dienic rubber latex is a vinyl aromatic monomer, a vinyl cyanide monomer, a methacrylate monomer, or an acrylate monomer.

Examples of the dienic rubber latex are polybutadiene, butadiene-styrene copolymer, butadiene-acrylonitrile copolymer, isoprene-butyl acrylate copolymer, and butadiene-methyl methacrylate copolymer. The dienic rubber latex may be directly polymerized to have a weight average particle size of 0.05 to 0.8 μm. Alternatively, the dienic rubber latex virgin with a particle size of 0.05 to 0.18 μm may be prepared firstly, which is then agglomerated to have a weight average particle size of 0.2 to 0.8 μm by a conventional rubber agglomerating method. Examples of the rubber agglomerating method includes a chemical agglomerating method, a mechanical stirring agglomerating method and a freezing agglomerating method. The chemical agglomerating method is achieved by adding an organic acid, a metal salt or a carboxylic acid group-containing polymeric agglomerating agent into the dienic rubber latex virgin. One of the polymeric agglomerating agent used in the chemical agglomerating process is butyl acrylate-methacrylic acid copolymer.

The rubber graft copolymer (A) is prepared by a conventional graft polymerization of a mixture of monomers in the presence of a dienic rubber latex. The mixture of vinyl aromatic monomers, vinyl cyanide monomers and, optionally, (meth)acrylate monomers is polymerized by graft polymerization so that some of the polymeric chain of the former monomers is grafted on or chemically bonded to the dienic rubber. By controlling the weight ratio of the monomers to the dienic rubber and by controlling the polymerization conditions thereof, a polymer with a desired degree of grafting can be obtained. Generally, the degree of grafting is affected by the conditions of the graft polymerization, the chemical properties of the rubbery polymer, the rubber particle size, the addition rate of monomers, and the amount and species of chain transfer agent and emulsifying agent.

The molecular weight of the grafted polymeric chain of rubber graft copolymer (A) can be controlled by adjusting the temperature of the graft polymerization and/or with the addition of a relatively small amount of a conventional chain transfer agent, such as mercaptan, halogen or terpene compounds. Examples of the chain transfer agent are n-dodecyl mercaptan, tert-dodecyl mercaptan, carbon tetrabromide terpinolene and 2,4-diphenyl-4-methyl-1-pentene.

The initiator or catalyst added in the graft polymerization process is generally in the range of 0.01 to 5.0 parts by weight, preferably in the range of 0.1 to 3.0 parts by weight based on the weight of copolymerizable monomers. The amount to be added depends on the monomers and the degree of polymerization. The initiator may be added continuously to facilitate the graft polymerization process. Generally, the monomers and initiators may be added at one time or may be added continuously or incrementally. The initiator may be a conventional radical initiator for use in emulsion polymerization, such as a peroxide, a diazo compound or a persulfate compound. Oil soluble peroxide initiators suitable for the graft polymerization include di-tert-butyl peroxide, benzoyl peroxide, lauroyl peroxide, oleyl peroxide, toluyl peroxide, di-tert-butyl-diperphthalate, tert-butyl-peracetate, tert-butyl-perbenzoate, dicumyl peroxide, tert-butyl-peroxide, isopropyl peroxy dicarbonate, 2,5-dimethyl-2,5-di(tert-butyl peroxy) hexane, 2,5-dimethyl-2,5-di(tert-butyl peroxy) hexane-3, tert-butyl hydroperoxide, cumene hydroperoxide, p-menthane hydroperoxide, cyclopentane hydroperoxide, di-isopropyl benzene hydroperoxide, p-tert-butyl cumene hydroperoxide, pinene hydroperoxide, 2,5-dimethyl-hexane-2,5-dihydroperoxide, or a mixture thereof.

The graft polymerization is conducted at a temperature between 20° to 100° C. and a pressure between 0 to 100 P.S.I.G. under inert atmosphere with stirring. The polymerization takes 2 to 10 hours, preferably 4 to 8 hours for more than 90% of monomers to be polymerized.

Examples of the vinyl aromatic monomers used in the present invention are styrene, α-methyl styrene, α-chlorostyrene, p-t-butyl styrene, p-methyl styrene, o-chlorostyrene, p-chlorostyrene, 2,5-dichlorostyrene, 3,4-dichlorostyrene, 2,4,6-tribromostyrene and 2,5-dibromostyrene. Styrene and α-methyl styrene are preferred.

Examples of the vinyl cyanide monomers used in the present invention are acrylonitrile, α-methyl acrylonitrile, isobutenenitrile, malononitrile and fumaronitrile. Acrylonitrile is preferred.

Examples of the (meth)acrylate monomer are methyl methacrylate, ethyl methacrylate, propyl methacrylate, butyl methacrylate, benzyl methacrylate, hexyl methacrylate, cyclohexyl methacrylate, dodecyl methacrylate, 2-hydroxyethyl methacrylate, glycidyl methacrylate, dimethyl-nitro-ethyl methacrylate, methyl acrylate, ethyl acrylate, propyl acrylate and butyl acrylate. Methyl methacrylate and butyl acrylate are preferred.

The copolymerizable monomers, such as maleimide-based monomer, acrylic acid monomers or maleic anhydride may also be added during graft polymerization in step 1 of the process of the present invention.

By means of the graft polymerization, a latex of rubber graft copolymer (a) having a weight average particle size of 0.05 to 0.8 µm is produced. If the weight average particle size is less than 0.05 µm, the impact strength would be insufficient. If the weight average particle size is greater than 0.8 µm, the gloss will be reduced.

A suitable coagulant should be added into the rubber graft copolymer latex (a) to coagulate the latter. Examples of the coagulant which are commonly used include acids, such as sulfuric acid and acetic acid, alkaline earth metal salts, such as calcium chloride, magnesium chloride, magnesium sulfates, and aluminium sulfate. The alkaline earth metal salts are preferred. The polymer slurry which has been coagulated is dehyrated, and then dried to produce a powdery rubber graft copolymer (A). The so-called degree of grafting of the rubber graft copolymer (A) is the weight ratio of the grafted rigid copolymer to the dienic rubber. Here the grafted rigid copolymer means the polymeric chains of the grafting monomers which are chemically bonded to the rubber. By controlling the molecular weight of the grafted rigid copolymer to be in the range of 40,000 to 120,000 and the degree of grafting to be in the range of 10 to 100%, the styrenic resin which has good impact strength, gloss and processibility can be obtained.

In step 2, the styrenic resin is prepared by continuous bulk or solution polymerization of 80 to 45 parts by weight of vinyl aromatic monomers, 15 to 50 parts by weight of the vinyl cyanide monomer and, optionally, 0 to 40 parts by weight of copolymerizable monomer (totally 100 parts by weight of monomers) in the presence of 0.1 to 6 parts by weight of the rubber graft copolymer (A) and 0.1 to 10 parts by weight of the acrylic-based copolymer to a conversion of 40 to 90 wt %. The reaction solution is then passed through a devolatilizing device in order to remove the unreacted monomers and the volatile components therefrom. A styrenic resin with a rubber content of 0.1 to 4.5 wt % is thereby obtained.

The form of the rubber graft copolymer (A) used in the present invention is not limited with any limitation. Generally, the rubber graft copolymer (A) is directly used in the form of powder, flake or granulate, which can be contained with water or not. In addition, the rubber graft copolymer (A) can be melt blended with the acrylic-based copolymer (B) in advance, then it is used in the step 2 polymerization.

The rubber content of the styrenic resin of the present invention is 0.1 to 4.5 wt %, preferably in the range of 0.2 to 4.0 wt %. If the rubber content is higher than 4.5 wt %, the hardness and rigidity of the resin will decrease, and the semi-transparency thereof cannot be obtained.

If the amount of the rubber graft copolymer (A) is less than 0.1 parts by weight, the resin will not have enough impact strength. If the amount of the rubber graft copolymer (A) is greater than 6 parts by weight, the styrenic resin will have the problems of reduced hardness and tensile strength, difficulty in dissolving and dispersing during polymerization and poor transparency of the styrenic resin. In addition, defects, such as fish eyes, may also be found on the appearance of the resin.

The acrylic-based copolymer (B) used in the present invention is composed of 10 to 100 wt % of at least one monomer selected from (meth)acrylic monomers and vinyl cyanide monomers, 0 to 80 wt % of vinyl aromatic monomers and 0 to 30 wt % of other copolymerizable monomers. Examples of the acrylic-based copolymer (B) are polymethyl methacrylate, methyl methacrylate-methyl acrylate copolymer, methyl methacrylate-n-butyl acrylate copolymer, methyl methacrylate-acrylonitrile copolymer, methyl methacrylate-acrylonitrile-styrene copolymer, acrylonitrile-styrene copolymer and methyl methacrylate-styrene copolymer. The polymerization may be solution, bulk, emulsion or suspension polymerization.

The amount of the acrylic-based copolymer (B) used in the process of the present invention is preferably in the range of 0.1 to 10 wt %, preferably 0.15 to 8 wt %. When the amount is less than 0.1 wt %, the rubber graft copolymer (A) tends to agglomerate and cannot be sufficiently dispersed in the solution, thereby resulting in difficulty in transportation by pumps during feeding into the reactor. Moreover, the resulting styrenic resin contains large agglomerated rubber which results in surface deficiencies, such as fish eyes, and reduced gloss. If the amount of the acrylic-based polymer (B) is greater than 10 parts by weight, it is not economical for large amounts of acrylic-based polymer (B) to be repeatedly polymerized and processed.

Examples of the vinyl aromatic monomers, vinyl cyanide monomers and (meth)acrylate monomers used for preparing the acrylic-based copolymer (B) are the same as those used for the preparation of rubber graft copolymer (A) and are not to be further explained hereinafter. The optional copolymerizable monomers may be methacrylic acid, acrylic acid, dimethylfumarate and maleimide-based monomers.

Examples of the maleimide-based monomer of the present invention are maleimide, N-methyl maleimide, N-isopropyl maleimide, N-butyl maleimide, N-hexyl maleimide, N-octyl maleimide, N-dodecyl maleimide, N-cyclohexyl maleimide, N-phenyl maleimide, N-2,3-dimethyl phenyl maleimide, N-2,4-dimethyl phenyl maleimide, N-2,3-diethyl phenyl maleimide, N-2,4-dibutyl phenyl maleimide, N-2,6-dimethyl phenyl maleimide, N-2,3-dichlorophenyl maleimide, N-2,4-dichlorophenyl, N-2,3-dibromophenyl maleimide and N-2,4-dibromophenyl maleimide. N-phenyl maleimide is most preferred. When maleimide is used as the copolymerizable monomers, a resin having high heat resistance can be obtained.

The organic solvent used in the continuous solution polymerization of step 2 is in an amount of 0 to 50 parts by weight based on 100 parts by weight of total monomers, preferably 0 to 25 parts by weight. If the amount of the organic solvent is greater than 50 parts by weight, the molecular weight of the copolymers will be excessively reduced and the production rate will be poor. The organic solvent is usually selected from aliphatic hydrocarbons, aromatic hydrocarbons, ketones or esters. The aromatic hydrocarbon is preferably toluene, ethylbenzene or xylene. The ketone is preferably butanone. The ester is preferably ethyl acetate. In addition, aliphatic hydrocarbons, such as n-hexane, cyclohexane and n-heptane, may be used for part of the solvent.

A polymerization initiator may be added to the reaction during the polymerization process. Examples of the polymerization initiator include an acyl peroxide, an ester peroxide, a ketal peroxide, a peroxy carbonate and a diazo compound having a nitrile group and a cyclohexyl ring. The structures of the above polymerization initiators are represented as follows:

acyl peroxide

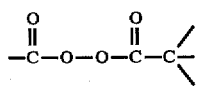

ester peroxide

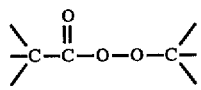

ketal peroxide

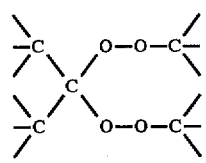

peroxycarbonate

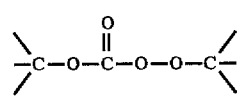

diazo compound having a nitrile group and a cyclohexyl ring ($R=H$ or $CH_3$)

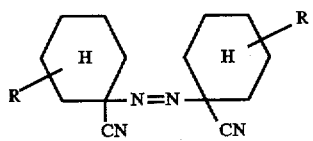

Polymerization initiators which have more than two groups of peroxy bonding are especially useful in raising the molecular weight and in improving the heat resistance of the resin. The amount of the polymerization initiator is generally in the amount of 0.01 to 1.0 wt %, based on the total monomers.

The polymerization temperature is controlled in the range of 80°0 to 200° C., preferably in the range of 90° to 160° C. If the polymerization temperature is below 80° C., the amount of the polymerization initiator need to be excessively increased to maintain the polymerization rate, which would be difficult to raise the molecular weight of the styrenic resin. If the reaction temperature is higher than 200° C., the molded article of the styrenic resin would have the drawbacks of silver streaks on the surface and decreased molecular weight or heat resistance. The pressure in the reactor is controlled at 1 to 5 kg/cm$^2$. The retention time for the raw material in the reactor is preferably 1 to 5 hours.

The conversion of polymerization in step 2 of the present invention should be in the range of 40 to 90%. It is not economical if the conversion of polymerization is less than 40%. If the conversion of polymerization is over 90%, bubbles, colored spots and silver streaks will be easily formed on the molded article of the styrenic resin, and the heat resistance of the resin would be lowered.

The amount of moisture present in the reaction system is below 0.3 wt %, preferably below 0.2 wt %, with respect to the total monomers. When the amount of moisture is greater than 0.3 wt %, it would result in colored spots and silver streaks on the molded article of the resin.

The polymerization process of the present invention may be accomplished by the reactors which are generally used for continuous bulk or solution polymerization. Examples of such reactors include plug flow reactors, continuous stirring tank reactors (CSTR) and tubular reactors having a static mixer. The CSTR is preferred. There may be one or more reactors. In the case that only one reactor is used, a reactor provided with a powerful stirrer is preferably used such that all components in the reactor can be uniformly mixed. If two or more reactors are used, the reactors may be arranged in parallel, in series or in a combination of both. When the continuous polymerization proceeds, the first reactor is preferably a CSTR or a tower type plug-flow reactor, while the reactor(s) after the first reactor may be a CSTR or plug-flow reactors. If a plurality of reactors are used, further monomers or polymerization initiators may be added in the second reactor or afterwards.

In order to control the molecular weight of the polymer, a chain transfer agent, such as tert-dodecyl mercaptan, n-dodecyl mercaptan, terpinolene and 2,4-diphenyl-4-methyl-1-pentene, may be used.

After the desired polymerization conversion has been attained, the resulting polymer solution is heated by a preheater to a high temperature and then devolatilized to remove unreacted monomers and volatile components. Generally, the devolatilization may be carried out by a reduced-pressure degassing device or an extruder degassing device, which vapors are then collected as recovery solution by a condenser. The recovery solution is dehydrated to remove the moisture contained therein for reuse as feed solution. The polymer melt which has been devolatilized is extruded and pelletized to form the styrenic resin with a rubber content of below 5 wt %. Various types of suitable additives, such as antioxidants, lubricants, light stabilizers, UV absorbers, processing aids, anti-statics, coloring agents, flame retardants, and heat-stabilizers, may be added to the styrenic resin of the present invention.

The styrenic resin of the present invention may be processed by injection molding, extrusion, and blow molding to produce various products.

The styrenic resin prepared by the process of the present invention may be blended with polycarbonate, styrene-acrylonitrile resin, PMMA, styrene-butadiene-acrylonitrile resin, polyamide or polyester.

The present invention is more specifically described and explained by means of the following Examples and physical property tests.

[Preparation Example 1]

Preparation of rubber graft copolymer (A-1)

| components | weight parts |
|---|---|
| 1,3-butadiene | 150.00 |
| potassium persulfate (1%) | 15.00 |
| potassium oleate | 2.00 |
| distilled water | 190.00 |
| ethylene glycol methacrylate | 0.13 |

The above components are reacted at 65° C. for 12 hours to yield a synthetic rubber latex with a conversion of 94% and having a solid content of 40% and a weight average particle size of 0.1 μm.

A carboxylic acid group-containing polymeric agglomerating agent was prepared from the following components:

| components | weight parts |
|---|---|
| ethyl acrylate | 90.0 |
| methacrylic acid | 10.0 |
| potassium persulfate solution (1%) | 0.5 |
| sodium dodecyl sulfate solution (10%) | 0.5 |
| n-dodecyl mercaptan | 1.0 |
| distilled water | 200.0 |

The above components are reacted at 75° C. for 5 hours to yield a carboxylic acid group-containing polymeric agglomerating agent with a conversion of 95% and a pH value of 6.0.

100 parts (dry weight) of the dienic rubber latex are then agglomerated with 3 parts (dry weight) of the carboxylic acid group-containing polymeric agglomerating agent to produce an agglomerated dienic rubber latex with a pH value of 8.5 and a weight average particle size of 0.31 μm.

A graft polymerization was then carried out to produce the rubber graft copolymer latex (a-1), according to the following recipe.

| components | weight parts |
|---|---|
| agglomerated dienic rubber latex (dry weight) | 100.0 |
| styrene | 25.0 |
| acrylonitrile | 8.3 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| potassium oleate | 1.2 |
| ethylene diamine tetraacetic acid (0.25%) | 3.0 |
| distilled water | 200.0 |

The rubber graft copolymer latex (A-1) prepared from the above components are coagulated with calcium chloride ($CaCl_2$), dehydrated, and dried to have a moisture content of below 2%, thus producing the powdery rubber graft copolymer (A-1) (rubber content=75 wt %). The degree of grafting of the rubber graft copolymer (A-1) is 22%. The molecular weight of the grafted styrene-acrylonitrile copolymer is 80,000.

[Preparation Example 2]

Preparation of rubber graft copolymer (A-2)

A graft polymerization process was conducted according to the following recipe.

| components | weight parts |
|---|---|
| synthetic rubber latex (0.1 μm) (dry weight) | 100.0 |
| styrene | 75.0 |
| acrylonitrile | 25.0 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 0.3 |
| potassium oleate | 1.5 |
| distilled water | 200.0 |

The dienic rubber latex was the same as Preparation Example I-1, the rubber graft copolymer (A-2) thus produces has the composition of 50 wt % of rubber, 38 wt % of styrene and 12 wt % of acrylonitrile. The weight average particle size of the rubber graft copolymer (A-2) is 0.1 μm and the degree of grafting thereof is 42%. The molecular weight of the grafted styrene-acrylonitrile copolymer is 70,000.

[Preparation Example 3]

Preparation of acrylic-based copolymer (B-1)

The acrylic-based copolymer (B-1) used in the present invention is CM-205 (a product of CHIMEI Corp., methyl methacrylate (MMA)-methyl acrylate (MA) copolymer, composition MMA/MA=97 wt %/3 wt %, MI=1.8 (ASTM D-1238 condition I))

[Preparation Example 4]

Preparation of acrylic-based copolymer (B-2)

A feed solution of raw material, which includes 76 wt % of styrene and 24 wt % of acrylonitrile, is mixed and fed into a reactor at a rate of 12 kg/hr. Ethylene-bis-stearamide at a rate of 3.0 g/hr, benzoyl peroxide, tert-dodecyl mercaptan and a recovery solution which will be described hereinafter are combined with the feed solution and are also fed into the reactor. The reactor is a CSTR. The reactor has a capacity of 45 liters and an internal temperature maintained at 108° C. The content of toluene in the reaction solution is maintained at 15% and the conversion of monomer is maintained at 55%.

After the polymerized solution has passed through a devolatilizing device so as to remove the volatile components from the polymerized solution, acrylic-based copolymer (B-2) used in the present invention is obtained. On the other hand, the removed volatile components are condensed by means of a condenser and serve as the aforementioned recovery solution which is used as part of the feed solution. The reaction rate of this process may be controlled by adjusting the amount of benzoyl peroxide or the amount of tert-dodecyl mercaptan. An acrylic-based polymer (B-2) having a melt index of 1 (ASTM D-1238, condition G) is formed.

The test standards for the physical properties and the appearance of the styrenic resin of the following Examples and Comparative Examples are as follows:

*Tensile strength is tested in accordance with ASTM D-638. The unit adapted is kg/cm$_2$.

*Impact strength (unknotched, ¼" thickness) is tested in accordance with JIS-K7110. The unit adapted is kg-cm/cm.

*Appearance of an extrusion sheet is inspected by the following procedure:

Forming a sheet with a thickness of 2.3 m/m by extruding the resin material through a single screw extruder L/D=28 (available from Gloucester Engineering Co., U.S.A.) and inspecting the appearance of the sheet. "X" indicates that fish eyes occurred on the surface of the sheet and "o" indicates that the surface of the sheet is smooth and no fish eye was found. "Δ" indicates that some fish eyes occured on the surface of the sheet.

*Transmittance: Injected pieces of the styrenic resin with 2 mm thickness are tested in accordance with ASTM D-1003. The unit adapted is %.

*Vicat Softening Temperature is tested in accordance with ASTM D-1525. The unit adapted is °C.

*Rock well Hardness is tested in accordance with ASTM D-785 (Mscale).

[Example 1]

The following components are mixed to form a raw material solution:

| components | weight parts |
| --- | --- |
| styrene | 67.00 |
| acrylonitrile | 28.00 |
| methyl methacrylate | 5.00 |
| ethylbenzene | 7.00 |
| rubber graft copolymer (A-1) (as prepared in Preparation Example 1) | 3.25 |
| acrylic-based copolymer (B-1) (as prepared in Preparation Example 3) | 1.00 |
| tert-dodecyl mercaptan | 0.09 |
| benzoyl peroxide (initiator) | 0.05 |

The raw material solution is continuously fed into a first reactor at a rate of 22 l/hr. The first reactor has a capacity of 44 liters and an internal pressure of 4 kg/cm$^2$. The reaction temperature is 120° C. and the retention time is 2 hours. The screw-type blender provided in the reactor operates at a rate of 100 rpm and the inside of the reactor has a circulating cooling coil therein. The polymerization mixture in the first reactor is continuously delivered into a second reactor which is identical to the first reactor. When the conversion of the monomers reaches 60%, the polymerization mixture is delivered into a devolatilizing device so as to remove unreacted monomers and volatile components therefrom, and is then extruded and pelletized. The pelletized product is injection molded to test its physical properties, appearance and transparency. The results are listed in Table 1.

[Example 2]

The procedure of Example 1 was repeated except that the monomers contained in the raw material solution includes 67.5 parts by weight of styrene, 27.5 parts by weight of acrylonitrile and 5 parts by weight of methyl methacrylate, and that the amount of the rubber graft copolymer (A-1) is 0.9 part by weight. The physical properties tested are listed in Table 1.

[Example 3]

The procedure of Example 1 was repeated except that the monomers contained in the raw material solution includes 67 parts by weight of styrene, 33 parts by weight of acrylonitrile and 0 part by weight of methyl methacrylate, that a rubber graft copolymer (A-2) prepared in Preparation Example 2 was added in an amount of 6 parts by weight as a substitute to the rubber graft copolymer (A-1) and that the amount of acrylic-based copolymer (B-1) is 3.5 parts by weight. The physical properties tested are listed in Table 1.

[Example 4]

The procedure of Example 1 was repeated except that the raw material solution includes 32 parts by weight of styrene, 37 parts by weight of α-methyl styrene, 31 parts by weight of acrylonitrile, 5 parts by weight of ethylbenzene, 1 part by weight of an acrylic-based copolymer (B-2) prepared in Preparation Example 4, 0.04 parts by weight of tert-dodecyl mercaptan, 0.12 part by weight of benzoyl peroxide as an initiator, and 2.54 parts by weight of rubber graft copolymer (A-1). The physical properties tested are also listed in Table 1.

[Example 5]

The procedure of Example 1 was repeated except that the raw material solution includes 67 parts by weight of styrene, 27 parts by weight of acrylonitrile, 6 parts by weight of N-phenyl maleimide, 20 parts by weight of ethylbenzene, 3 parts by weight of acrylic-based copolymer (B-1), 0.1 parts by weight of tert-dodecyl mercaptan, 0.025 parts by weight of benzoyl peroxide as an initiator, and 3.36 parts by weight of rubber graft copolymer (A-1). The physical properties tested are also listed in Table 1.

[Comparative Example 1]

The procedure of Example 1 was repeated except that the monomers contained in the raw material solution include 68 parts by weight of styrene, 27 parts by weight of acrylonitrile and 5 parts by weight of methyl methacrylate, and that the rubber graft copolymer (A) and the acrylic-based copolymer (B) are not included in the raw material solution. The physical properties tested are also listed in Table 1.

[Comparative Example 2]

The procedure of Example 1 was repeated except that the monomers contained in the raw material solution include 68 parts by weight of styrene, 26 parts by weight of acrylonitrile and 6 parts by weight of methyl methacrylate, and that the rubber graft copolymer (A-1) is in an amount of 3.2 parts by weight while the acrylic-based copolymer (B-1) is not included in the raw material. The physical properties tested are also listed in Table 1.

[Comparative Example 3]

The procedure of Example 1 was repeated except that the monomers contained in the raw material solution include 69 parts by weight of styrene, 27 parts by weight of acrylonitrile and 4 parts by weight of methyl methacrylate, and that the amount of the rubber graft copolymer (A-1) is 7.28 parts by weight and the amount of the acrylic-based copolymer (B-i) is 1 part by weight. The physical properties tested are also listed in Table 1.

[TABLE 1]

| | | Example 1 | Example 2 | Example 3 | Example 4 | Example 5 | Comparative Example 1 | Compapative Example 2 | Comparative Example 3 |
|---|---|---|---|---|---|---|---|---|---|
| Raw material solutrion | Rubber graft copolymer (A) (parts by weight) | 3.25 (A-1) | 0.9 (A-1) | 6.0 (A-2) | 2.54 (A-1) | 3.36 (A-1) | 0 | 3.2 (A-2) | 7.28 (A-1) |
| | acrylic-based copolymer (B) (parts by weight) | 1 (B-1) | 1 (B-1) | 3.5 (B-1) | 1 (B-2) | 3 (B-1) | 0 | 0 | 1 (B-1) |
| Rubber content in the styrenic resin (wt %) | | 3.8 | 1.1 | 4.3 | 3.0 | 3.8 | 0 | 3.8 | 8.0 |
| Tests | Tensile strength | 523 | 577 | 508 | 546 | 511 | 680 | 462 | 445 |
| | Impact strength | 22.3 | 19.2 | 21.8 | 21.8 | 21.6 | 16.2 | 19.1 | 35 |
| | Rock Well hardness | 77 | 85 | 84 | 82 | 89 | 84 | 68 | 62 |
| | Vicat softening temperature | 106 | 106 | 106 | 112 | 126 | 106 | 105 | 103 |
| | Transmittance (%) | 60.2 | 63.4 | 55.9 | 57.7 | 52.9 | 88 | 30.3 | 20.6 |
| | Appearance of the sheet | O | O | O | O | O | O | x | Δ |

The results of Comparative Example 1 indicate that the styrene-acrylonitrile copolymer prepared by conventional solution or bulk polymerization has good tensile strength and high transparency. However, the impact strength is obviously low and cracks occurred even after only a slight impact. In Comparative Example 2, the styrenic resin does not contain an acrylic-based copolymer (B). When the amount of the acrylic-based copolymer (B) is less than 0.1 part by weight, the rubber graft copolymer (A) tends to coagulate and cannot be sufficiently dispersed in the styrenic resin, thereby resulting in poor tensile strength and unsatisfactory hardness. Moreover, the appearance of the sheet has surface deficiencies, such as fish eyes, and the transparency of the resin is also poor. It is further noted from the results of Comparative Example 3 that, when the amount of rubber graft copolymer (A) is 7.28 parts by weight and the total rubber content in the resin is more than 4.5 wt %, the impact strength of the resulting product can be significantly improved. However, the physical properties, such as tensile strength, Vicat softening temperature and hardness will become poor. Moreover, since the rubber graft copolymer (A) cannot be Sufficiently dispersed in the styrenic resin, the transparency of the resin becomes poor and the appearance of the sheet has surface deficiencies, such as fish eyes.

The results of the Examples 1 to 5 show that the resin prepared by the process of the present invention has suitably improved impact strength, with the tensile strength and the hardness thereof being maintained. The resulting product having transmittance higher than 50% exhibit semi-transparency characteristic and the appearance of the sheet is smooth and fish eyes were not found.

With this invention thus explained, it is apparent that numerous modifications and variations can be made without departing from the scope and spirit of this invention. It is therefore intended that this invention be limited only as indicated in the appended claims.

I claim:

1. A process for preparing a styrenic resin by a continuous bulk or solution polymerization method, said resin having a rubber content of 0.1 to 4.5 wt. % which process comprises:

(i) continuously charging into a reactor a feed containing 80 to 45 parts by weight of a vinyl aromatic monomer, 15 to 50 parts by weight of a vinyl cyanide monomer, 0 to 40 parts by weight of a copolymerizable monomer, and 0.1 to 6 parts by weight of a powdery rubber graft copolymer (A), based on a total of 100 parts by weight of said monomers, wherein said powdery rubber graft copolymer (A) has a weight average particle size of 0.05–0.8 μm and is prepared by coagulating and drying a rubber graft copolymer latex (a), wherein said rubber graft copolymer latex (a) is made from graft polymerization of vinyl aromatic monomer and vinyl cyanide monomer in the presence of dienic rubber latex;

(ii) charging to said reactor 0.1 to 10 parts by weight of an acrylic-based copolymer (B) based on a total of 100 parts by weight of said monomers, wherein said acrylic-based copolymer (B) is rigid and soluble in said monomers and is prepared from at least one monomer selected from methyl methacrylate and acrylonitrile, and a vinyl aromatic monomer, and wherein said acrylic-based copolymer (B) is added to said feed in an amount sufficient to facilitate the introduction of the feed into the reactor by preventing agglomeration of said copolymer (A) and thereby improving the dispersion of said copolymer (A) in said feed;

(iii) polymerizing said feed in the presence of said acrylic-based copolymer (B) to a conversion of 40 to 90 wt. %; and (iv) removing the unreacted monomers and volatile components from the polymerized mixture.

2. A process for producing a styrenic resin according to claim 1, wherein the temperature of said bulk or solution polymerization is 80° to 200° C. and the pressure thereof is 1 to 5 kg/cm$^2$.

3. A process for producing a styrenic resin according to claim 1, wherein the retention time of said bulk or solution polymerization is 1 to 5 hours.

4. A process for producing a styrenic resin according to claim 1, wherein an alkaline earth metal salt is used for coagulating rubber graft copolymer latex (a).

5. A process for producing a styrenic resin according to claim 1, wherein the degree of grafting of said rubber graft copolymer (A) is 10 to 100% and the molecular weight of the grafted rigid copolymer of said rubber graft copolymer (A) ranges from 40,000 to 120,000.

6. A process for producing a styrenic resin according to claim 1, wherein said vinyl aromatic monomer is styrene or α-methyl styrene.

7. A process for producing a styrenic resin according to claim 1, wherein said copolymerizable monomer is a maleimide-based monomer.

8. A process for producing a styrenic resin according to claim 1, wherein said acrylic-based copolymer (B) is methyl methacrylate-methyl acrylate.

9. A process for producing a styrenic resin according to claim 1, wherein said acrylic-based copolymer (B) is styrene-acrylonitrile copolymer.

10. A process for producing a styrenic resin according to claim 1, wherein the acrylic-based copolymer (B) is prepared from 10 to 100 wt. % of said at least one monomer selected from methyl methacrylate and acrylonitrile, and 0 to 80 wt. % of said vinyl aromatic monomer.

* * * * *